US006020023A

United States Patent [19]

Keller et al.

[11] Patent Number: 6,020,023

[45] Date of Patent: Feb. 1, 2000

[54] PROCESS AND DEVICE FOR REPAIRING SMALL PAINT DEFECTS IN PAINT COATS

[75] Inventors: Anja Keller, Blaustein; Fritz Dannenhauser, Ulm; Klaus Sussmann, Leonberg; Juergen Hanf, Tuebingen; Claudia Witt, Eberdingen, all of Germany

[73] Assignees: DaimlerChrysler AG, Stuttgart, Germany; Micro Compact Car AG, Biel, Switzerland; Eisenmann Maschinenbau KG, Boeblingen; Karl Woewag, Lack-und Faben-fabrik GmbH & Co. KG, Stuttgart, both of Germany

[21] Appl. No.: 09/105,985

[22] Filed: Jun. 29, 1998

[30] Foreign Application Priority Data

Jun. 27, 1997 [DE] Germany ............................ 197 27 324

[51] Int. Cl.[7] ...................................................... B32B 35/00

[52] U.S. Cl. ........................... 427/140; 427/271; 427/557

[58] Field of Search ..................................... 427/140, 271, 427/275, 557, 559; 156/94, 98; 52/514, 514.5

[56] References Cited

U.S. PATENT DOCUMENTS

| | | |
|---|---|---|
| 2,536,665 | 1/1951 | Skoog . |
| 4,814,200 | 3/1989 | Propst . |
| 4,959,251 | 9/1990 | Owens et al. . |
| 5,470,609 | 11/1995 | Leach et al. . |
| 5,834,054 | 11/1998 | Berry . |

FOREIGN PATENT DOCUMENTS

| | | |
|---|---|---|
| 3833225 | 4/1989 | Germany . |
| 196 46 956 | 5/1998 | Germany . |
| 2-99171 | 4/1990 | Japan . |
| 9-192590 | 7/1997 | Japan . |

OTHER PUBLICATIONS

"Home Repair & Improvement", Better Homes and Gardens Guide pp. 37–39, 1997.

English–language abstract of DE 196 46 956, May 1998, Derwent Information Ltd.

*Primary Examiner*—Fred J. Parker
*Attorney, Agent, or Firm*—Evenson, McKeown, Edwards & Lenahan PLLC

[57] ABSTRACT

A process and apparatus for repairing small paint defects in powder paint coats. In the process, the paint defect is hollowed out, a filler body, which is adapted to the recess with respect to shape and/or volume, is placed in the recess, the filler body is connected with the powder paint coat surrounding the recess and hardened. In order to improve the quality of this repair, after inserting the filler body, pressure is exercised on the filler body at least at the start of the connecting and/or at least at the start of the hardening.

13 Claims, 1 Drawing Sheet

PROCESS AND DEVICE FOR REPAIRING SMALL PAINT DEFECTS IN PAINT COATS

BACKGROUND AND SUMMARY OF THE INVENTION

This application claims the priority of German Patent Document 197 27 324.6, which was filed on Jun. 27, 1997, the disclosure of which is expressly incorporated by reference herein.

The invention relates to a process as well as an apparatus for repairing small paint defects in paint coats known from German Patent Document DE 196 46 956.2 as the type on which this invention is based.

From German Patent Document DE 196 46 956.2, which has not been published, it is known for repairing relatively small paint defects in the case of powder-type paints, to hollow out the powder-type paint coat in the area of the paint defect; to insert a filler body in the recess, and to adapt the filler body to the recess with respect to the shape and/or the volume; and then to connect the filler body with the powder-type paint coat surrounding the recess and harden it. Despite the advantages of this approach, the result of the repair is still visible in some cases and should therefore be improved.

It is an object of the invention to improve the repairing process on which this invention is based such that the repair has a higher quality.

According to the invention, this object is achieved by means of a process comprising, hollowing out the paint defect to form a recess surrounded by the powder-type paint coat, adapting a filler body to at least one of the shape and the volume of the recess, connecting the filler body with the powder-type paint coat, hardening the filler body, and applying pressure to the filler body during, and preferably at the start of, at least one of the connecting and hardening steps. By exercising a pressure at least at the start of the connecting of the filler body with the powder-type paint coat and/or at least at the start of the hardening of the filler body, the quality of the repair is improved and the number of visible repair points is reduced. An apparatus is also provided.

Other objects, advantages and novel features of the present is invention will become apparent from the following detailed description of the invention when considered in conjunction with the accompanying drawings.

DETAILED DESCRIPTION OF THE DRAWINGS

Figure 1:
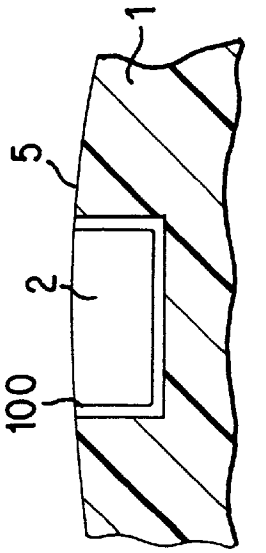
FIG. 1 is a cutout of a sectional view of a powder-type paint coat with a cylindrical recess made in the area of a defective spot.

FIG. 1 is a view of a cutout of a curved powder-type paint coat 1 of a substrate. The substrate may, for example, be made of a metal, a plastic material and/or a fiber-reinforced plastic material. Despite various precautionary measures, during the application of the powder-type paint coat 1, defects may occur, as for example, enclosed grains of dust. For repairing a defective spot, this spot is provided with a recess 2 within the limited range of the powder-type paint coat which, in particular, is set and hardened. In the present case, this recess has a cylindrical shape. In the present embodiment, the defect, for example, the grain of dust, is eliminated simultaneously by means of the recess 2 maximally placed at the depth of the powder-type paint coat 1.

Advantageously, the recess 2 is made in a cutting manner and, particularly by means of an asymmetrical milling—that is, the blades of the milling cutter do not extend through the center of the cutting surface—or grinding into the powder-type paint coat 1. Furthermore, the recess 2 can also be drilled and/or keyhole-sawed and/or burnt out by means of a laser and/or punched out and/or ground. In all methods of placing the recess 2 in the powder-type paint coat 1, care should be taken that, with respect to its surface or width and also with respect to its depth, the recess 2 is placed in the powder-type paint coat 1 with precisely defined dimensions as well as with a defined edge contour.

Figure 2:
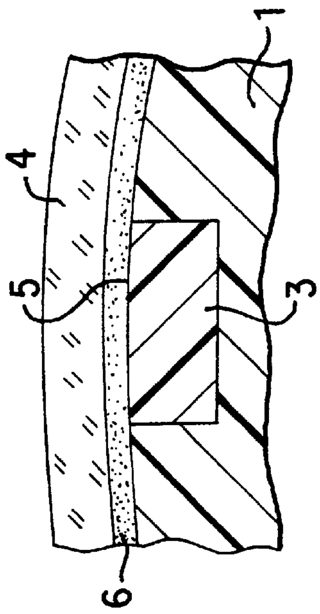
FIG. 2 is a cutout of a sectional view of a powder-type paint coat with a cylindrical recess made in the area of a defective spot with a filler body arranged in the recess.

Subsequently, as illustrated in FIG. 2, a small-plate-type filler body 3 formed of powder-type paint and/or of an initial product of the powder-type paint is placed in the recess 2; that is, that, among other things, the contour of the bottom of the filler body 3 is adapted to the contour of the bottom of the recess 2. Likewise, the edges of the filler body 3 are matched to the corresponding edges of the cylindrical recess 2.

The filler body 3, which is at least partially cross-linked before being placed in the recess 2, is dimensioned according to the volume of the recess 2 and has a cohesive construction in the manner of a monolith; that is, the diameter of the monolithically cohesive filler body 3 corresponds approximately to the width of the recess 2 and the layer thickness of the filler body 3 corresponds approximately to the depth of the recess.

With respect to the filler body 3, this precise dimensioning can be implemented in a simple manner in that the filler body 3 is shaped, particularly punched, from a previously produced coating foil. In the case of at least some effect powder-type paints, this coating foil is expediently produced by electromagnetic spraying for obtaining desired visual characteristics.

A pressure body 4 is placed on the visible side of the filler body 3 arranged in the recess 2 and expediently projects beyond the edges of the recess 2 and also advantageously rests flatly with respect to the edges of the recess 2 against the visible side 5 of the powder-type paint coat 1.

Subsequently, the filler body 3 is connected to the powder-type paint coat 1 arranged outside the recess 2. In this case, it at least at the start of the connecting, a pressure of preferably maximally 1 bar is exercised on the pressure body 4 and, by way of the pressure body 4, on the filler body 3. As a result, among other things, a good connection is obtained as well as a qualitatively good, particularly plane transition between the filler body 3 and the powder-type paint coat 1.

The connection preferably takes place by an adhesive layer 100 which is arranged either on the filler body 3 or, before the filler body 3 is placed in the recess 2, along the corresponding walls of the filler body 3.

Subsequently, the filler body placed in the recess 2 and optionally the adhesive layer are heated and/or reacted. By means of the heating and/or by means of the reaction, particularly the filler body 3 and optionally also the adhesive layer will harden. Also in this case, at least at the beginning of the hardening, a pressure is exercised on the filler body 3 by way of the pressure body 4. Since the surface of the pressure body 4 resting against the filler body 3—thus the contact surface 6—expediently has a construction which is as smooth as possible, this pressure also results in a good surface of the hardened filler body 3.

The reaction is preferably initiated and/or maintained by UV-radiation and/or electromagnetic, particularly IR-radiation, and/or hot air. If the hardening of the filler body 3 is initiated by electromagnetic radiation, the material and the layer thickness of the pressure body 4 is meaningfully selected such that through the pressure body 4 at least 50% of the radiation emitted behind it is transmitted in the direction of the filler body 3.

Furthermore, during the hardening and/or also during the connecting of the filler body 3 with the powder-type paint coat 1, gas may be formed, which is why the pressure body 4 expediently has pores in the area of its contact surface 6 on the filler body 3, through which pores the forming gas is discharged.

So that these pores have no negative effect on the surface quality of the visible side of the filler body 3, the crosssection of the pores is as small as possible. In particular, these are so-called micropores or, at least in the case of the contact surface 6, microporous materials. In this case, polytetrafluoroethylene (PTFE) was found to be particularly suitable as the material for the contact surface of the pressure body 4 since, by means of this material, layers of this type can be produced in a known manner (for example, GORETEX™).

Furthermore, the contact surface 6, and in a special development, also the whole pressure body 4 can be made of so-called nano-particles. If, in the case of such a contact surface 6 or such a pressure body 4, the connecting of the filler body 3 and/or the hardening of the filler body 3 is initiated by means of electromagnetic radiation, particularly IR-radiation, it is expedient to select the size of the nano-particles to be smaller than the wavelength of the corresponding radiation.

Since, depending on the used material, the filler body 3 may exhibit a volume shrinkage during hardening, it is also advantageous to provide the filler body 3 with a volume which corresponds approximately to the volume of the recess 2 plus the volume shrinkage of the filler body 3 which occurs during the hardening.

In addition, when applying another layer, particularly a clear coating 7, to the powder-type paint coat 1, it may be advantageous to place the recess 2 and to fill the recess 2 with the filler body 3 before the application of the clear coating 7.

Figure 3:
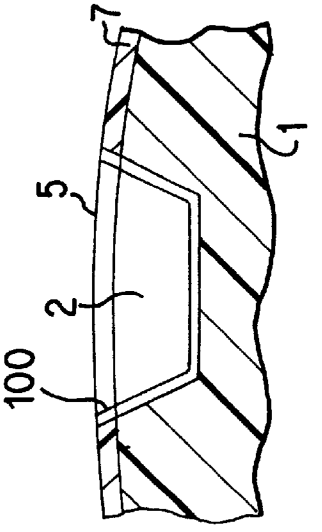
FIG. 3 is a cutout of a sectional view of a powder-type paint coat covered with a clear coating and having a truncated-cone-shaped recess.

FIG. 3 illustrates a powder-type paint coat 1 which, in the area of a defective spot of the, in particular, set and hardened powder-type paint coat 1, is provided with a truncated-cone-shaped recess 2. The cone of the recess 2 closes toward the substrate. By means of the recess 2 which is placed to maximally the depth of the powder-type paint coat 1, the defect, for example, a grain of dust, is eliminated simultaneously.

Figure 4:
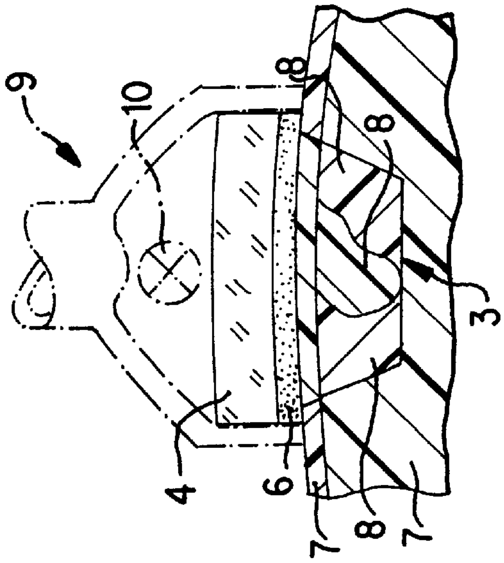
FIG. 4 is a cutout of a sectional view of a powder-type paint coat covered with a clear coating and having a truncated-cone-shaped recess with a filler body arranged in the recess.

FIG. 4 illustrates the truncated-cone-shaped recess 2 with the filler body 3 arranged in it as well as the repair device arranged above the filler body 3. The filler body 3 is produced of powder-type paint and/or an initial product of the powder-type paint and, in particular, has the shape of a small plate. With respect to their geometrical dimensions and also with respect to their course, which, for example, in the case of a placing of the recess 2, does not necessarily have to be round, but may, for example, be kidney-shaped, the edges of the filler body 3 are adapted to the edges of the recess 2.

The full surface of the recess is previously covered with an above-described coating foil for inserting the filler body 3 in the recess. The filler body 3 is punched out of the covering coating foil and, during the punching-out, is placed and/or pressed directly into the recess 2.

As illustrated in FIG. 4, it is possible that in this case the filler body 3 could break into individual fragments 8. A filler body 3 which is formed before the setting with the remaining powder-type paint coat 1 of individual fragments 8, in the sense of the invention, is also to be understood as a cohesive filler body 3; that is, the filler body 3 arranged in the recess 2, before it is connected with the walls and the bottom of the recess 2, must not necessarily have a completely monolithic construction.

The filler body 3 arranged in the recess 2 is connected with the powder-type paint coat 1 arranged outside the recess 2 by the above-mentioned measures. The connection takes place by a direct joining of the material of the filler body 3 with the material of the powder-type coating 1 surrounding it. However, the connection of the filler body 3 with the powder-type paint coat 1 does not have to take place along the whole joint surface but can be limited to individual joint partial surfaces. In the case of filler bodies 3 formed of fragments 8, the fragments 8 are connected with one another simultaneously in the same manner.

If, as illustrated in FIG. 4, a defective spot is noticed only after the application of a clear coating 7, the repair can take place largely analogously, in which case it will now be useful to use a filler body 3 formed of the powder-type coat which, in addition, is provided on the visible side with a clear coat, the layer thickness of this clear coat corresponding approximately to that of the clear coat 7 which is arranged on the powder-type paint coat 1 of the substrate.

For connecting and/or for hardening, the repair device 9 is placed on the powder-type paint coat 1 and on the visible side 5 of the filler body 3. The repair device 9 is constructed in the manner of a pressure bell and, at its end area, has a pressure body 4 which is held in an axially movable manner.

In such an embodiment of the repair device 9, the application of the contact pressure during the connecting or hardening of the filler body 3 can take place in a simple manner in that the pressure within the repair device 9 is raised and the pressure body is therefore pressed out in the direction of the powder-type paint coat 1 and thus of the filler body 3.

In addition to the already addressed porous construction at least of the contact surface 6 of the pressure body 4, it is also advantageous for the pressure body 4 to be at least slightly elastic and/or flexible at least in the area of the contact surface 6 because it can then, in the case of curved surfaces, adapt itself to or place itself against these in a simple manner.

Furthermore, a radiation source 10 is arranged in the pressure bell of the repair device by means of which radiation source 10 the connecting and/or the hardening of the filler body 1 can be carried out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for repairing a paint defect of a powder paint coat, comprising:

(a) hollowing out the paint defect to form a recess surrounded by the paint coat;

(b) shaping a filler body comprising powder paint to at least one of the shape and the volume of the recess;

(c) placing the shaped filler body into the recess;

(d) hardening the filler body; and (e) applying pressure to the filler body during at least one of step (c) and (d) to form a planar transition between the filler body and the paint coat.

2. The process according to claim 1, wherein the pressure is applied at least at the start of one of step (c) and step (d), and pressure is thereafter switched off.

3. The process according to claim 1, wherein the pressure is applied on a visible-side surface of the filler body.

4. The process according to claim 1, wherein the pressure is no greater than 1 bar.

5. The process according to claim 1, wherein pressure is applied on a visible side of the filler body by at least one of a pressure body having a smooth contact surface facing the filler body and a pressure foil.

6. The process according to claim 5, wherein the recess has edges and the pressure body projects beyond the edges.

7. The process according to claim 6, wherein pressure is applied by the pressure body.

8. The process according to claim 6, wherein pressure is applied with the pressure foil.

9. The process according to claim 1, wherein during at least one of step (c) and step (d), the filler body is heated, and any gas formed is discharged through pores in at least one of a smooth contact surface of a pressure body and a pressure foil.

10. The process according to claim 1, wherein at least one of step (c) and step (d) is performed by heating by electromagnetic, infrared or short-wave infrared radiation.

11. The process according to claim 10, wherein at least one of step (c) and step (d) is performed by infrared radiation.

12. The process according to claim 10, wherein at least one of step (c) and step (d) is performed by short-wave infrared radiation.

13. The process according to claim 10, wherein at least 50% of the electromagnetic radiation is transmitted in the direction of the filler body by a pressure body or a pressure foil.

* * * * *